J. McClean.
Dredging Mach.
Nº 101,898. Patented Apr. 12, 1870.
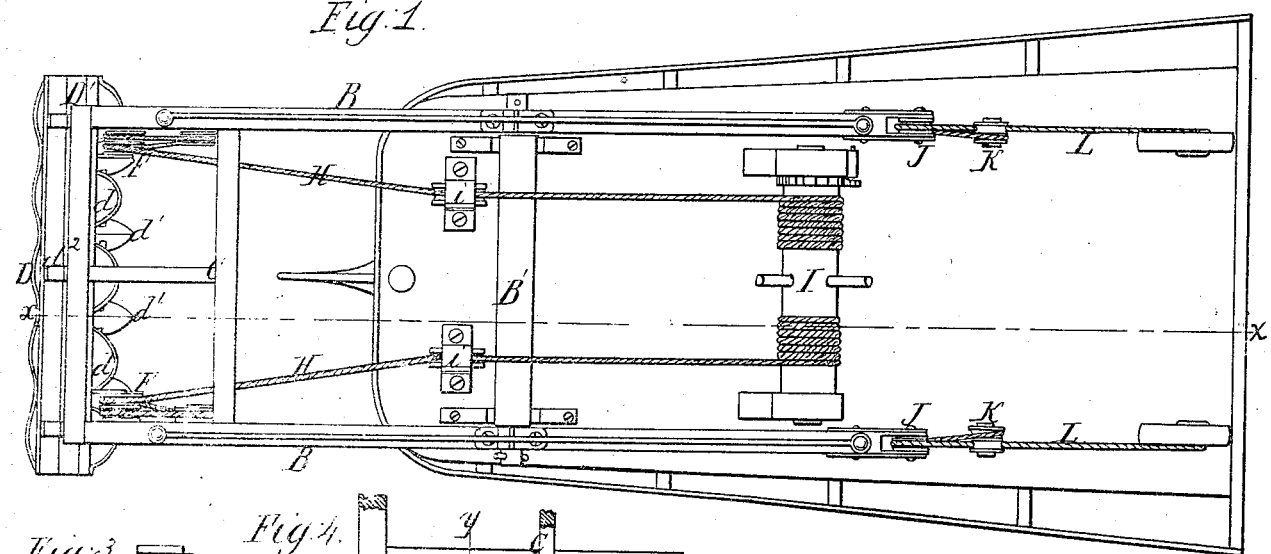
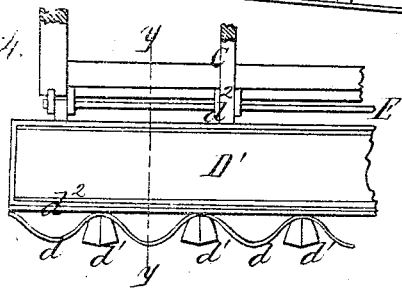
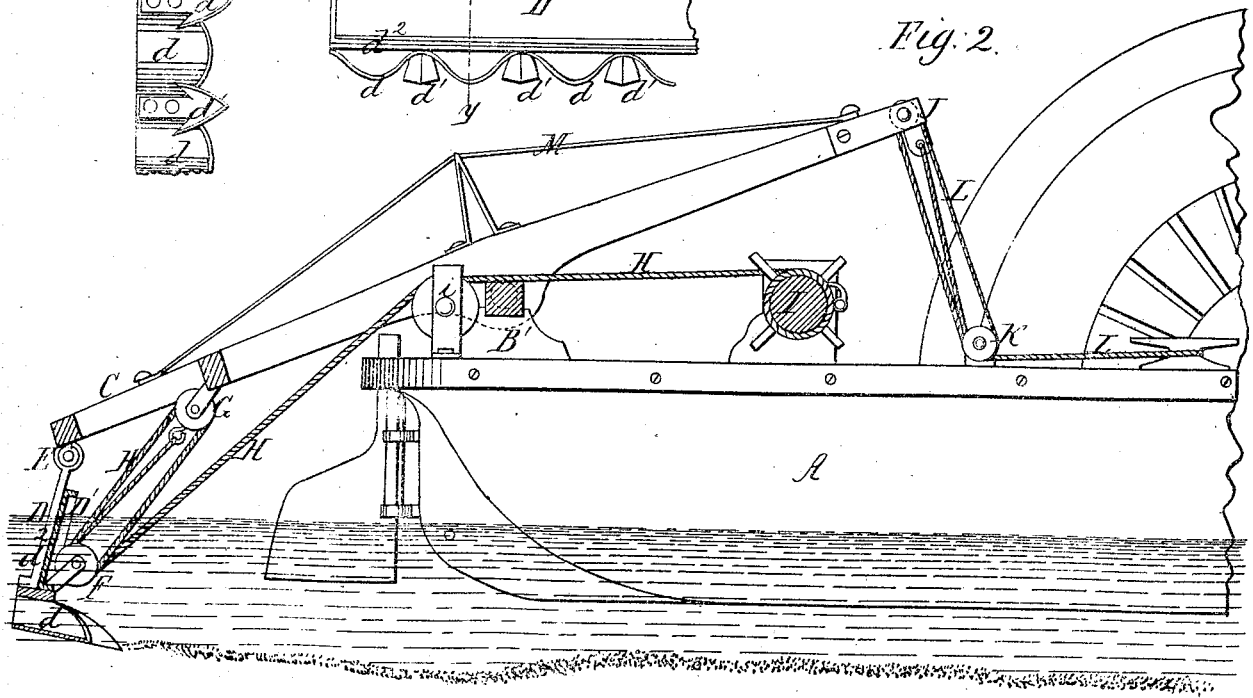
Witnesses:
Fred. Artos
Charles Ewing
Inventor:
John McClean
By McGill, Grant &co
Attys

UNITED STATES PATENT OFFICE.

JOHN McCLEAN, OF NEW ORLEANS, LOUISIANA.

IMPROVEMENT IN DREDGING-MACHINES.

Specification forming part of Letters Patent No. 101,898, dated April 12, 1870.

*To all whom it may concern:*

Be it known that I, JOHN McCLEAN, of New Orleans, in the parish of Orleans and State of Louisiana, have invented certain new and useful Improvements in the Mode of Constructing and Operating Dredging-Machines; and I do hereby declare the following to be a full and exact description thereof, reference being had to the accompanying drawings, making part of this specification.

The nature of my invention consists in a dredging-machine simple and strong in its parts, and constructed in such a manner that the channel being dredged will be plowed and scraped and the obstructing debris drawn out of it and deposited in deep places or packed upon its banks by the motive power of the boat direct, without the employment of additional machinery. To do this I construct a frame consisting of two levers of suitable length, the drawings representing levers about eighty feet long, and attach them together at one end by a strong end frame of about twenty feet wide, and brace the levers with suitable metal bands or rods. This frame, at its center, is hung upon bearings placed in the rear or stern of the boat, so that nearly one entire half of it will extend beyond the same. The other end of the frame is attached to the deck of the boat by means of suitable pulleys and chains, so as to admit of its being raised or lowered as required. To the under side of the other end of this frame is hinged a plow, consisting of a plate of iron about twenty-five feet long and six feet deep, and suitably braced by a strong metal frame and bands of similar material. The lower end of the frame is provided for its entire length with a series of metal arc-shaped plows or knives placed on a line with its bottom. Between each of these plows are placed angular plowshares, the bottoms of which come on a line with the bottom of the arc-shaped plows or knives. The plow so formed is connected by chains or ropes passing from pulleys attached to the bottom of its frame to pulleys attached to the front beam of the end frame, so as to admit of its adjustment to any angle desired.

In the accompanying drawings, Figure 1 represents an isometrical view or plan of the plow as attached to the rear of the boat. Fig. 2 represents a longitudinal section of Fig. 1, taken on the line $x\ x$. Fig. 3 represents a bottom view of the plowshares, and Fig. 4 a front view of the same.

A is the boat, B B the levers, and B' the fulcrum of the same; C, the end frame; D, the plow; D', its plate, and $d$ and $d'$ the plowshares. The plowshares $d$ are left open to prevent their glutting.

$d^2$ is the plow-frame.

E is a joint, by means of which the plow is attached to the end of the frame C.

F F are double wheel pulleys attached to the lower end of the frame of the plow, and G G are single-wheel pulleys attached to the front beam of the end frame, C.

H H are chains connecting the plow D by means of the pulleys F and G to the windlass I.

$i\ i$ are guide or friction wheels for the ropes or chains H H to run on.

J J are pulley-wheels placed in the inner end of the levers B, and K K are pulleys attached to the deck of the boat, and L is a chain or rope connecting the pulleys J J and K K, and by means of which the plow-frame is raised or lowered as desired.

M M are rods bracing the levers D.

The operation of my invention is as follows: The plow D is raised up on a line with the deck of the boat by means of the chains or ropes L L working in the pulleys J J and K K, and the boat backed up the channel which it is desired to plow and clean out. On arriving at the desired point the chains or ropes L L are loosened and the levers dropped until the plow D rests against the bottom of the channel. The plow is then adjusted by means of the windlass I and the boat started forward, which causes the plow to cut, scrape, and clean the bottom of the channel and pack the debris up against the plate of the plow, which carries it to the point where it is desired to deposit it, when it is dropped from the plow by raising it and changing its angle in the manner before described.

I do not wish to confine myself to the dimensions of the parts herein mentioned, but leave their selection to be made according to the character of the dredging to be performed.

Having thus fully described the nature and operation of my invention, what I claim as new, and desire to secure by Letters Patent, is—

1. The operating frame, consisting of the levers B B and end frame C, when provided with the adjustable plow D, pulleys J K, and rope L, constructed as shown, and hung and arranged so as to admit of the plow being raised or lowered as desired, as herein set forth and described.

2. The plow D, consisting of the plow-plate D', plows $d$ and $d'$, plow-frame $d^2$, attached to the frame C, as shown, and provided with the pulleys F G and rope H, so as to admit of its angle being determined or adjusted as desired, as herein set forth and described.

In testimony that I claim the foregoing invention I have hereunto set my hand this 5th day of February, 1870.

JOHN McCLEAN.

Witnesses:
 CHARLES MOLITOR,
 FRED M. MOHRMANN.